May 24, 1966  U. L. NISSEL  3,253,188
CONTROL CIRCUIT

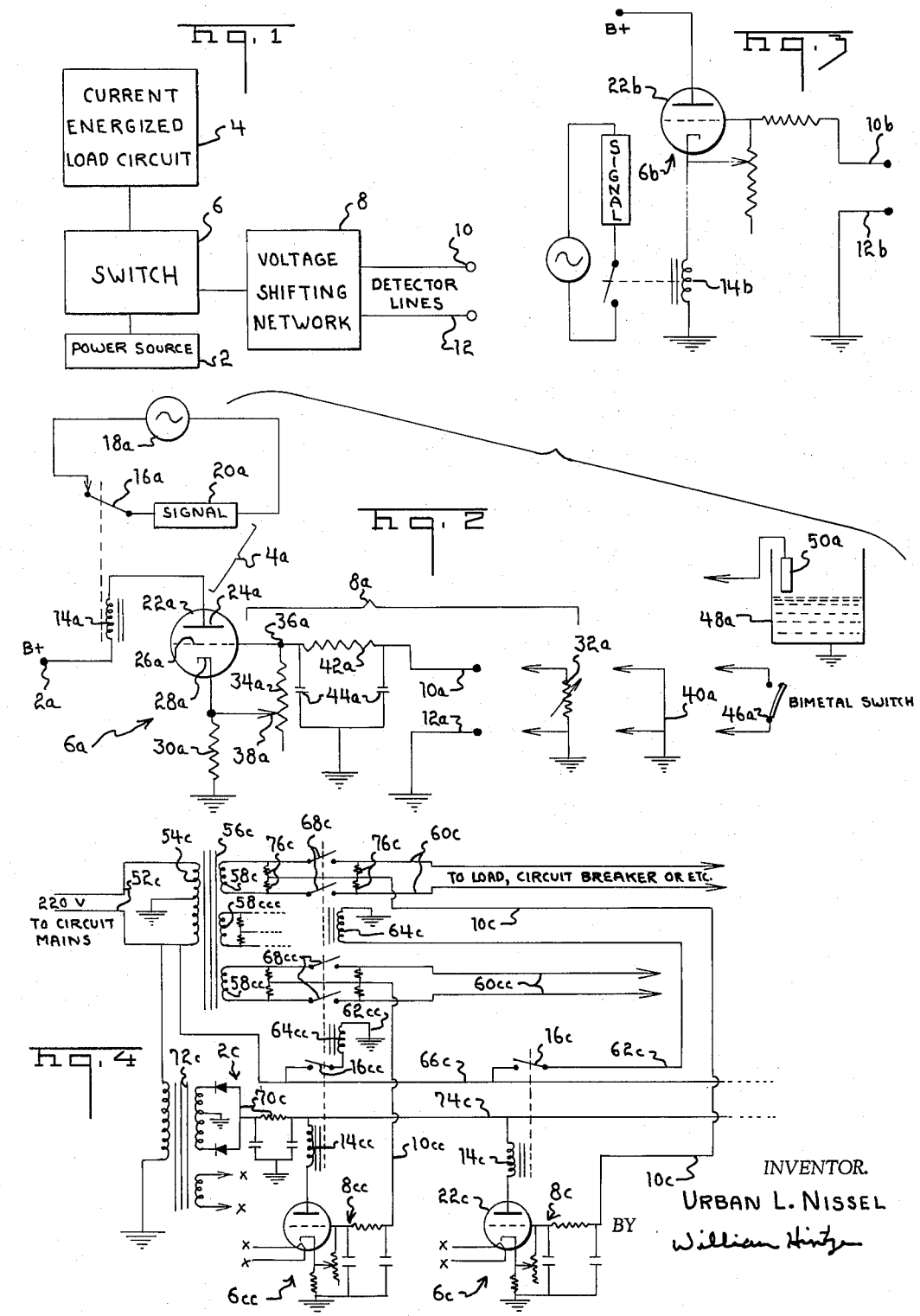

Filed May 28, 1962  3 Sheets-Sheet 2

INVENTOR.
URBAN L. NISSEL
BY William Hintze

May 24, 1966   U. L. NISSEL   3,253,188
CONTROL CIRCUIT

Filed May 28, 1962   3 Sheets-Sheet 3

INVENTOR.
URBAN L. NISSEL
BY William Hintz

United States Patent Office 3,253,188
Patented May 24, 1966

3,253,188
CONTROL CIRCUIT
Urban L. Nissel, Harrisburg, Pa.
(Box 302–A, R.D. 1, New Cumberland, Pa. 17070)
Filed May 28, 1962, Ser. No. 198,283
15 Claims. (Cl. 317—10)

This invention relates in general to control systems for electrical switching or signalling functions, or the like, and has particular reference to circuit control according to the magnitude of its leakage resistance.

To signal the change from the normal characteristics of a body or system is a common use electrical circuitry especially where the change to be noted is exhibited by a change in electrical impedance or resistance. Generally stated it is an object of the present invention to provide an improved control circuit which is easily adaptable to use over a wide range in the aforesaid field.

The control system of this invention is particularly advantageous in that: the state of the body is sampled electrically and controlled, if desired, without significant electrical disturbance of the body; it is selectively or adjustably sensitive to suit the impedance magnitudes according to the conditions of a particular use; the reaction to a given change in impedance is substantially instantaneous; it is simple and inexpensive in circuitry while being reliable and self-indicative of failure of fail-safe in operation; a progressive indication of impedance change may be signalled if desired; it is voltage-sensitive in nature so as to be essentially independent of electrical charge on or current flow through the test body, which current flow can be negligible for most conditions of use; the control may be exercised continuously by permanent installation in a system, or may be applied as desired in a portable unit.

Exemplary of the uses to which the foregoing advantages render the control system well-suited include the use as a test or guard circuit for the electrical circuits utilized in conjunction with a swimming pool to prevent accidental shock should such circuits develop faults, or for a service power line to prevent accidental shock or electrocution caused by contact with a live wire or internal grounding to frame of an electrical appliance, or as a monitor for above-ground wiring systems which may interrupt power for serious ground faults, or may merely warn that insulation deterioration or leakage from any cause is accumulating, or as a fire or burglar trigger device to operate an alarm, or as liquid level control, or as an impedance discriminator which, for example, may sort resistors within any selected tolerance range.

These and other advantages and uses will become apparent to those skilled in the art upon reading the following detailed description when taken in conjunction with the drawings in which:

FIGURE 1 is a block diagram for purposes of facilitating the description of the illustrative embodiments of the present invention;

FIGURE 2 is a wiring of a simple form of control circuit, and schematically indicates several modes of application, all in accordance with the principles of the invention;

FIGURE 3 is a wiring diagram of a typical variation of the circuit of FIGURE 2;

FIGURE 4 is a wiring diagram illustrating the use of the circuit of FIGURE 2 as a permanently installed multi-circuit power service line guard circuit;

Figure 5:
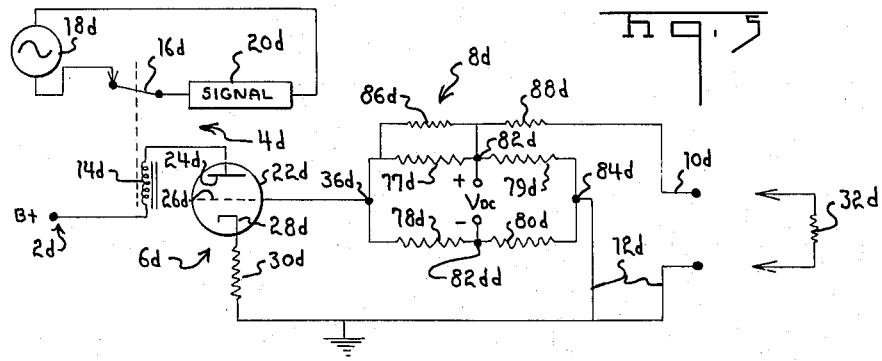
FIGURE 5 is a wiring diagram of a simple form of another control circuit in accordance with the present invention.

In those forms of the invention chosen for purposes of illustration, the general circuit arrangement and principles of operation may more easily be understood by first referring to the block diagram of FIGURE 1. As shown, a source 2 of power supplies energy to a current energized load circuit 4 through a switch 6 which, in the preferred embodiments, is of the normally "on" voltage-sensitive type. A voltage shifting network 8, preferable a voltage dividing impedance circuit of a type to reflect the magnitude of the impedance detected or appearing across detector lines or probes 10 or 12 as will be explained, normally develops a control voltage to maintain switch 6 in the "on" condition except when the magnitude of the impedance, usually predominately resistive in nature, at detector lines 10 and 12 drops below a predetermined magnitude. Upon detector lines 10 and 12 exhibiting an impedance less than the given value, switch 6 is turned to the "off" condition to reverse the operative state in load circuit 4 which typically includes a relay. As alluded to above detector lines 10 and 12 may be coupled to appropriate points in a system, the change in impedance characteristics of which are desired to be noted or acted upon, such as to detect the magnitude of leakage resistance in a power service line or to probe for liquid level in a tank.

In the following detailed description several embodiments for the block of FIGURE 1 will be illustrated in connection with typical uses to which the invention may be put; other embodiments within the purview of the invention will occur to those skilled in the art as best suited to these or other uses according to the conditions of a particular use. For simplicity of reference when describing the various embodiments, comparable elements will be similarly designated except for the addition of a letter suffix to the common reference character.

Turning now to the illustrative circuit of FIGURE 2, the current energized load circuit 4a is shown to include such components as a relay having a coil 14a which, when sufficiently energized, operates its armature to open a normally closed switch contact 16a to break a circuit applying energy from a suitable source 18a to a signalling device 20a. Signalling device 20a may be an indicator light, alarm, solenoid operated valve, slave relay or the like as desired. Switch 6a, for controlling the energizing current flow to coil 14a from source 2a, is shown as an electronic conduction valve 22a, conveniently a vacuum tube triode having an anode 24a which is connected to coil 14a in series with the B+ supply source 2a, a control grid 26a, and a suitably energized cathode 28a. In this embodiment valve 22a is self-biased to a conduction level energizing coil 14a sufficiently to close contact 16a by a grounded cathode degeneration resistor 30a connected to cathode 28a.

It is contemplated that when an impedance 32a, normally predominately resistive in nature, below a predetermined magnitude is coupled across detector leads 10a and 12a, network 8a will react to cause the conduction level through valve 22a to cease or at least decrease below the level necessary for coil 14a to hold contact 16a open, this reaction to occur quickly and without appreciable sensing or detecting current to flow through impedance 32a, and essentially independent of the level of such current flow. These ends are achieved by means of network 8a comprising a voltage divider including a preferably variable resistor 34a and the impedance or resistance 32a at detector lines 10a and 12a, the tap point 36a therebetween being connected to control grid 26a. Resistor 34a, at its adjustable terminal 38a, is directly connected to cathode 28a so that it functions as a grid-drop resistor upon circuit continuity being established from tap 36a to the grounded side of cathode resistor 30a through any resistance 32a which connects detector line 10a to ground. In this connection it will be understood that detector line 12a can usually be omitted since in most uses of the system the detected impedance will be grounded which will provide the necessary circuit continuity.

It will be appreciated, of course, that where resistance 32a constitutes the insulation of a power service line, its value desirably remains fixed. For ease in explaining the operation of the control circuit, however, it will be assumed that resistance 32a is subject to change and initially is greater than resistor 34a by several orders of magnitude, although subject to substantial decrease in value. Initially, therefore, when the detector lines 10a and 12a are connected across resistor 32a the grid-to-cathode bias of valve 22a is substantially zero; whatever voltage is developed across cathode resistor 30a and applied to the voltage divider network of resistors 34a–32a almost all appears across resistor 32a, thus placing the tap point 36a substantially at cathode potential. Conduction through valve 22a, thus, can be quite high and is primarily inversely dependent on the magnitude of cathode resistor 30a which has a value to insure energization of relay coil 14a. As resistor 32a decreases, the voltage division across the voltage divider will shift accordingly and the potential at tap point 36a relative to cathode potential will drop. When the resistance of resistor 32a decreases to a predetermined value, the grid-to-cathode bias thereby has been dropped sufficiently to reduce the conduction of valve 22a below the energization level of relay coil 14a. Signalling device 20a will then be actuated.

Setting the circuitry to operate signalling device 20a at the predetermined value of resistor 32a is accomplished by coupling the desired resistor to the detector lines and varying resistor 34a until relay coil 14a cuts out. In this connection, it usually will be advantageous to assure that in any event the current magntiude through impedance 32a remains at a very low level, which can be achieved regardless of the sensitivity of the circuitry in relation to the magnitude of the predetermined value of resistor 32a. That is, the resistance of the voltage divider network may always be quite high relative to resistor 30a even where the circuitry is designed to operate only on dead shorts, as represented by shorting bar 40a in FIGURE 2.

For high values predetermined for resistor 32a, resistor 34a may likewise be large to limit the current magnitude in the voltage divider network. Where the circuitry is to discriminate between low resistance values, to enable resistor 34a to remain large it may be necessary to connect an additional resistor 42a in series in detector line 10a. In any event resistor 42a is advantageous in that it may comprise, with a pair of condensers 44a, a conventional pi filter network in detector line 10a to prevent any alternating current appearing on the detector lines from affecting operation of valve 6a.

As alluded to above, the control system is adaptable to a variety of uses, singly or in combination. For example, detector lines 10a may be appropriately coupled to a power service line, as will be explained in connection with FIGURE 4, to detect leakage resistance or ground faults; in addition the detector circuit may include a conventional bimetallic switch 46a appropriately located to close and complete the voltage divider circuit upon development of a dangerous hot spot in a protected area. Similarly, the voltage divider circuit may be closed by the liquid level in a tank 48a rising to an electrode 50a connected to detector line 10a. Signalling device 20a in this case can take the form of a solenoid-operated valve arranged to permit liquid to flow into tank 48a when coil 14a is de-energized.

FIGURE 3 illustrates a simplification of the control system circuitry of FIGURE 2. By selecting apropriate component types for valve 22b and relay coil 14b, the resistance of the coil may equal the resistance necessary for proper cathode degenerative action. Coil 14b is then connected to the cathode of valve 22b, dispensing with the normal cathode resistor.

The control system of FIGURE 2 is well-suited to serve as a guard circuit for a power service line, particularly in a permanent installation where multiple circuits are to be protected from ground faults or against causing shock upon personal contact. Such a system is shown in FIGURE 4 where the main power or service lines 52c are connected to energize the primary winding 54c of the transformer 56c having one or more secondary windings 58c, 58cc, 58ccc, each of which serves to supply electrical power to two-wire service or load lines 60c or 60cc and to any electrical appliance, lights, outlet sockets, machinery or the like (not shown) to be connected across these service lines. Transformer 56c advantageously serves as an isolation transformer which elevates the load lines above ground, the guard circuit being arranged to interrupt service on the load lines upon development of the first leakage resistance to ground below the predetermined magintude anywhere in the load line system, including the secondary windings. When isolation of the load lines are preferred, it will be apparent that other apparatus than a transformer, such as an alternator, may be used.

The load lines are individually monitored by the respective guard circuits including switches 6c, 6cc, etc., each being similar in circuitry and function to the system of FIGURE 2 except that the switch contact 16c or 16cc of relay coil 14c or 14cc is normally open. When closed by sufficient energization of exemplary coil 14c, contact 16c closes a branch circuit line 62c to connect a slave relay coil 64c to a bus line 66c which is connected to circuit mains 52c. When energized by closure of contact 16c, slave relay coil 64c operates its associated armature to close the normally open contacts 68c of a double-pole single-throw switch in series with the two wires of load line 60c. Contacts 68c could, of course, be placed on the primary side of transformer 56c.

Power source 2c providing the D.C. supply voltage for valve 22c includes a conventional full-wave rectifier and filter circuit 70c energized by a secondary transformer 72c, the primary of which is also connected to circuit mains 52c, thus to provide the proper D.C. voltage on the bus line 74c common to all the guard circuits as shown.

Exemplary detector line 10c is coupled to service lines 60c through a resistor network arranged to minimize the A.C. energy on the detector line and to sustain operation of the guard function regardless of the opening of contacts 68c. Thus, four equal resistors 76c are arranged in two series-connected pairs which are connected across the service lines 60c, one pair on each side of switch contacts 68c. Detector line 10c is then connected to each junction point of the resistor pairs.

As thus arranged, relay coil 14c normally maintains contacts 16c closed, which in turn causes slave relay coil 64c to close contacts 68c and energize service lines 60c. Any leakage resistance lower than the predetermined value on the service line, however, is sensed by detector line 10c to shift the voltage division in network 8c, lowering the conduction level of valve 22c sufficiently to de-energize coil 14c. Thereupon, contact 16c opens and coil 64c is de-energized to open contacts 68c. Service on lines 60c will thus be interrupted until the leakage resistance defect is cured.

Under certain conditions of use it will be preferred that voltage shifting network 8 be energized independently of switch 6, e.g. to improve the fail-safe operation in a guard circuit, and that impedance discrimination be more positive and accurate than provided by the embodiment of FIGURE 2. Such features are inherent in the embodiment of the invention illustrated in FIGURE 5 in which current energized load circuit 4d, power source 2d and switch 6d are generally similar to the system of FIGURE 2 with the exception that cathode degeneration resistor 30d has a magnitude high enough to cathode-bias valve 22d to a conduction level below the energization level of relay coil 14d. Network 8d is arranged to develop, independently of the energization of the circuit of switch 6d, a bias voltage at tap point 36d and control electrode 26d which normally is sufficient to counteract the cathode bias of resistor 30d. Bias voltage at tap point 36d, therefore, is to render control electrode 26d sufficiently less negative relative to cathode 28d that valve 22d conducts at a current level above the energization level for coil 14d to open contact 16d and de-energize signalling device 20d.

In the embodiment of FIGURE 5, therefore, network 8d includes a resistance bridge which, for purposes of illustration, is formed by four fixed and equal resistors 77d, 78d, 79d, and 80d. The bridge is energized across one pair of opposite junctions 82d, 82dd by any suitable D.C. voltage source; output of the bridge is applied between the control grid 26d and the low voltage end of cathode resistor 30d. That is, the other pair of opposite bridge junctions 84d and tap point 36d are connected to ground and grid 26d respectively. As thus connected, the net effect considering only the bridge resistors 77d, 78d, 79d, and 80d and the D.C. source on the grid-to-cathode bias of valve 22d is zero; tap point 36d and bridge junction 84d would be at the same potential and valve 22d would not be caused to conduct enough to energize coil 14d.

To develop the net positive effect relative to the grid-to-cathode bias of valve 22d for normal energization of coil 14d, the voltage division in the side of the bridge adjacent control electrode 26d, which side includes resistors 77d and 78d, is altered or shifted to raise the voltage potential at tap point 36d. For example, a shunting resistor 86d may be connected in parallel to resistor 77d, lowering the resistance of this arm of the bridge which is independently reflected as the desired rise in the potential at tap point 36d.

Detector lines 10d and 12d serve to couple any detected resistance 32d to the resistor bridge in a manner to alter the voltage relations between the sides of the bridge always in a direction to decrease the voltage potential relative to ground of tap point 36d. For example, altering the voltage division in the remote side, i.e. resistors 79d and 80d, of the bridge to shift the positive terminal 82d of the D.C. voltage source toward ground potential, and the negative terminal 82dd still more negative by a similar amount, accomplishes the desired effect. Thus, the potentials of terminals or bridge junctions 82d and 82dd relative to ground are the reference potentials for the voltage division across the adjacent side of the bridge. Dropping the potential at junction 82d by coupling resistance 32d in the circuit, drops the potential of tap point 36d an equal amount which is in the direction to cut off conduction in valve 22d.

Detector lines 10d and 12d, therefore, are shown connected to bridge junctions 82d and 84d which couples resistance 32d in parallel across resistor 79d, thus lowering the resistance and the voltage drop across this arm of the bridge in the desired manner.

In operation of the system of FIGURE 5, therefore, valve 22d is normally maintained conductive to energize coil 14d only by the imbalance afforded by resistor 86d of the adjacent side of the resistance bridge. When the resistance 32d at the detector lines decreases below a predetermined value, the arm 79d of the bridge is lowered in resistance by that amount necessary to shift the potential of junction 82d, and hence tap point 36d, in a negative direction enough to bias valve 22d to a conductive state below the energization level of coil 14d.

It should be observed that the bridge resistors essentially may have any magnitude since it is their comparative values which govern the circuit-controlling voltage divisions. For some uses the resistors are preferably quite large, in the order of megohms, whereby the predetermined value of the detected impedance 32d may also be high. The larger the bridge resistors, the larger impedance 32d may be to shunt resistor 79d sufficiently to de-energize coil 14d in the manner described, hence the more sensitive is the circuit. Sensitivity of the circuit may be made adjustable by employing variable resistors in the bridge, and in any event a single resistor of appropriate value will normally be used in place of the parallel resistor combination of resistors 77d and 86d. Also, a current-limiting resistor 88d may be connected in series in detector line 10d for protection against a dead short, although sensitivity is thereby lowered.

By way of specific example, a 10 volt drop at tap point 36d is assumed to be the requirement to de-energize coil 14d; the bridge circuit parameters are: D.C. voltage source is 30 volts and bridge resistors including resistor 86d are 2 megohms each. Tap point 36d will be (+)5 volts relative to ground since the drop across resistors 77d and 86d is (−)10 volts while that across resistor 79a is (+)15 volts. If the detected resistance is 500K, the resistance of the bridge arm including resistor 79d is lowered to 400K, dropping the voltage thereacross to 5 volts and increasing the drop across resistor 80d from 15 volts to 25 volts. Junction 82d thus drops to (+)5 above ground, junction 82dd to (−)25 volts below ground, and tap point 36d to (−)5 volts below ground, the required 10 volt drop. If resistor 88d is 250K, the predetermined value of the detected resistance is halved to 250K.

Figure 6:
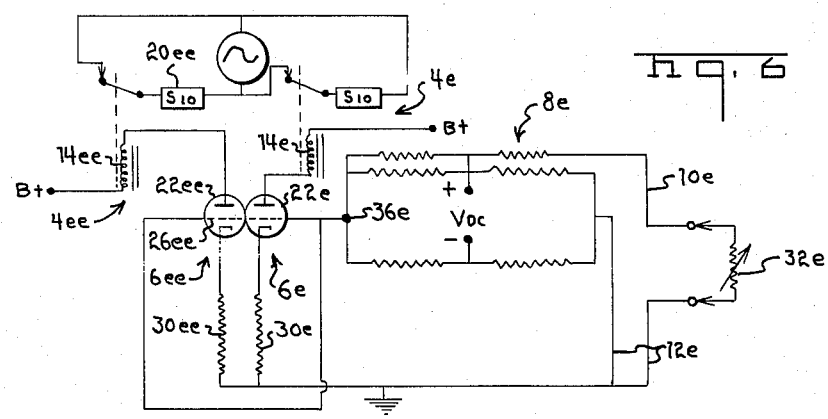
FIGURE 6 is a wiring diagram of a typical variation of the circuit of FIGURE 5.

In the embodiment of the invention shown in FIGURE 6, the circuit of FIGURE 5 has been modified so as to provide multiple sensitivity. Plural signalling devices are arranged to give, for example, a progressive indication of an advancing condition such as the deterioration of the insulation of a service line system prior to actual interruption of service. Multiple sensitivity is attained by adding one or more switches 6ee and current energized load circuits 4ee in parallel with switch 6e to voltage shifting network 8e. Switch 6e and network 8e are the same as shown in FIGURE 5. Each additional circuit portion, however, is made more or less sensitive than the base circuit of switch 6e by connecting the control electrode 26ee in common to tap point 36e, but selecting a cathode resistor 30ee different in value from cathode resistor 30e. The cathode bias on valve 22ee is thereby changed relative to the bias on valve 22e. If cathode resistor 30ee is larger, signalling device 20ee will be actuated sooner than signalling device 20e for a decreasing variance in detected resistance 32e. This occurs because a lesser shift in voltage at tap point 36e is required to reduce the grid-to-cathode bias of valve 22ee below that necessary to sustain sufficient current flow for energization of coil 14ee; the greater the magnitude of resistance 32e, the lesser the voltage shift at tap point 36e.

Figure 7:
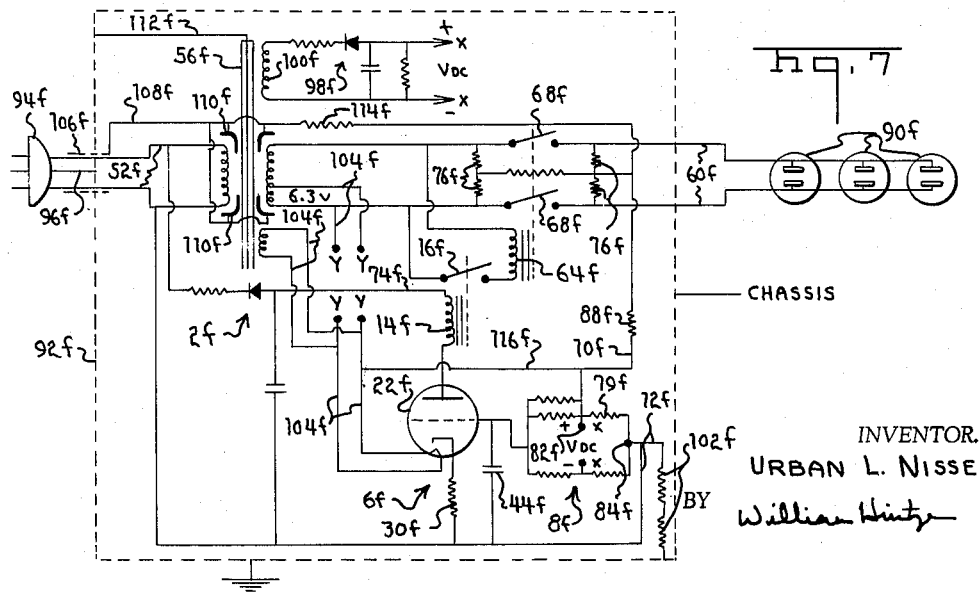
FIGURE 7 is a wiring diagram illustrating the use of the circuit of FIGURE 5 as a portable power service line guard circuit.

The control system of FIGURE 5 is particularly well-suited to serve as the guard circuit of a portable unit, illustrated in FIGURE 7, which can be plugged into a conventional convenience outlet to provide a guarded service line 60f having outlet sockets 90f for supplying power to appropriate electrical apparatus. As shown in FIGURE 7, the portable unit is housed in a chassis 92f, and is provided with a plug 94f for feed-through of the main service lines 52f. Preferably plug 94f is of the three-pronged type, the third prong connecting the chassis by line 96f to the ground wire of the main service ground wire (not shown).

In general switch 6f and network 8f of FIGURE 7 are similar in circuitry and function to the circuit of FIGURE 5. In common with the guard circuit of FIGURE 4, however, the unit of FIGURE 7 perferably includes an isolation transformer 56f having its primary supplied by main lines 52f and its secondary feeding service lines 60f. Also, relay coil 14f with its contact 16f actuates a slave relay inducing a coil 64f and service interrupting contacts 68f on both sides of lines 60f. Detector line 10f is similarly coupled to both lines 60f on either side of contacts 68f by a resistor network 76f. Slave relay coil 64f, however, is connected in series with contact 16f across service line 60f ahead of contacts 68f.

Power source 2f is shown as a conventional resistor, rectifier and filer condenser combination connected across main lines 52f to the D.C. supply voltage on bus line 74f. The independent D.C. voltage for exciting network 8f is conveniently obtained by a conventional rectifier 98f fed by an additional secondary winding 100f on the core of transformer 56f. Resistors 102f in detector line 12f between the ground connection thereof to chassis 92f and bridge junction 84f serve to assure isolation of the chassis from the A.C. power source. A separate filament winding of isolation transformer 56f is connected by lines 104f to the filament of valve 22f in the usual manner. Alternatively, a filament tap on the secondary of transformer 56f and leads 104ff may be used although with different consequences as will be explained. A filter condenser 44f directly connects the control electrode of valve 22f to chassis and by-passes any A.C. energy on the detector lines from affecting operation of valve 22f.

In operation, valve 22f is normally held conductive by the bias developed by network 8f, thereby closing contact 16f which energizes coil 64f to close contacts 68f. Leakage resistance to ground anywhere on service lines 60f, or in the equipment connected to sockets 90f, is detected by lines 10f and 12f. If the leakage resistance drops at least to the predetermined value, contacts 68f are caused to open and to remain open until the defect is cured inasmuch as coil 14f and coil 64f are de-energized by the voltage shift in network 8f.

From the foregoing it should be appreciated that detector line 10f can be extended to cover any point in the system which is susceptible to developing undesirable leakage resistance. For example, a weakness common to most portable equipment is where the power line enters the housing or chassis. In the illustrative embodiment of FIGURE 7, this weakness is guarded against by slipping a flexible metal sleeve 106f over the length of main lines 52f where they extend through chassis 92f. Sleeve 106f is insulated in any suitable fashion from both main lines 52f and chassis 92f, but preferably is slipped under the insulating jacket normally covering main lines 52f. Sleeve 106f is connected to detector line 10f by branch detector line 108f thereby placing the insulation gap between the sleeve and the chassis across bridge resistor 79f. Breakdown of this insulation gap will trigger the guard circuit in the manner as has been explained.

Another weakness susceptible to similar treatment is in the isolation transformer itself. A typical transformer for the present use comprises a three-legged core about which the various windings are disposed. Usually, breakdown occurs, or leakage resistance develops, between the ends of the windings and the core. To detect such leakage resistance, flexible copper plates 110f are interposed in insulated fashion between the ends of the winding and the adjacent parts of the core. Grounding of the core to chassis 92f by ground line 112f, and connecting plates 110f to branch detector line 108f, serves to place the critical insulation gap across bridge resistor 79f.

The leakage resistance at both sleeves 106f and plates 110f usually is quite low relative to the preferred predetermined detected resistance magnitude for the remainder of the system. When this condition exists and is tolerable, a resistor 114f in series in branch line 108f lowers the sensitivity of branch line circuit to prevent premature triggering of the guard circuit.

Another incipient fault in electronic systems which normally is difficult to pin-point, but which is easily detected by the present invention, is the development of filament-to-cathode leakage resistance in valve 22f, either by direct contact between filament and cathode or by the valve becoming gassy. Detection of such leakage resistance is inherent in the guard circuit of FIGURE 7 where the filament is excited by a filament tap on the secondary winding of transformer 56f. It may be observed that the insulation gap between the filament and cathode is coupled across resistor 79f of network 8f, and hence, on deterioration may trigger the guard circuit. The detector line path may be traced on one side of resistor 79f from bridge junction 82f, along detector line 10f to either one of service lines 60f, and thence to filament lines 104f and to the filament; on the other side, the path leads from bridge junction 84f, along detector line 12f through cathode resistor 30f to the cathode.

If, for reasons of lowering the sensitivity of the guard circuit, resistor 79f is assigned a relatively low value, a filament tap preferably is not used because the feature of detecting filament-to-cathode leakage tends to be lost. A gaseous tube, in the early stages of deterioration, may have a leakage resistance which, in combination with resistors 88f, 76f and 30f in the detector line path, may be too high to be detected. Resistors 88f and 76f may be eliminated from the detector line circuit by employing a separate filament winding, as shown, and connecting leads 104f directly to bridge junction 82f by branch detector line 116f.

Figure 8:
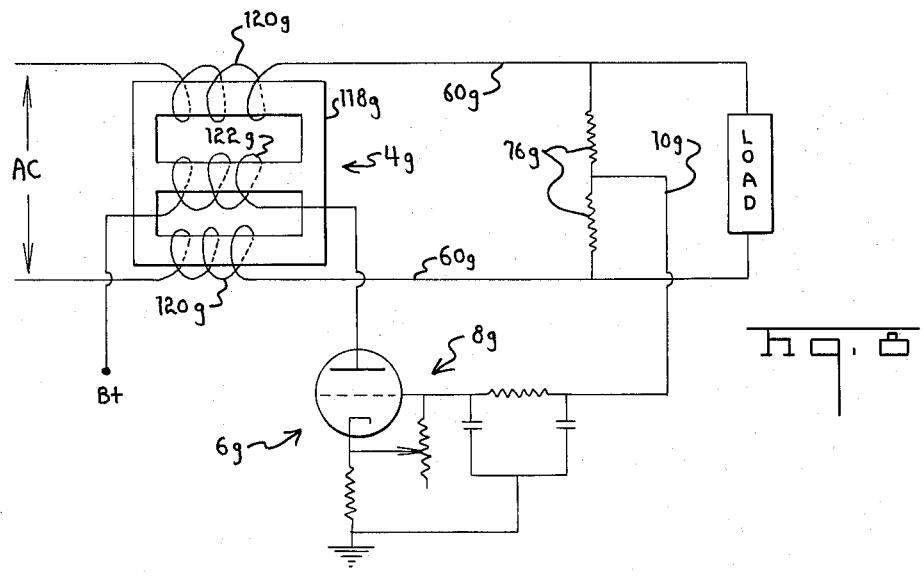
FIGURE 8 is a wiring diagram of a variation in the manner in which the circuit of FIGURE 2 exercises the control function.

It will be understood by the skilled in the art that interruption of power service may be performed by devices other than a relay. In the embodiment of FIGURE 8, for example, current energized load circuit 4g takes the form of a saturable core reactor having, on the outer legs of a three-legged core 118g, a pair of windings 120g through which service lines 60g lead. A control winding 122g on the inside leg of core 118g has the current level therethrough controlled by a guard circuit, including switch 6g, network 8g, detector line 10g, and coupling resistors 76g, which in circuitry and function is similar to the guard circuit of FIGURE 4.

In normal operation switch 6g is "on" whereby sufficient current flows through winding 122g to saturate core 118g. The inductive reactance of windings 120g, therefore, is negligible and full service is had on lines 60g. Detected leakage resistance to suffice to turn switch 6g to the "off" condition, however, results in core 118g becoming unsaturated. The inductive reactance of windings 120g then increases to a very high value to reduce the current in lines 10g to a negligibly small value.

Figure 9:
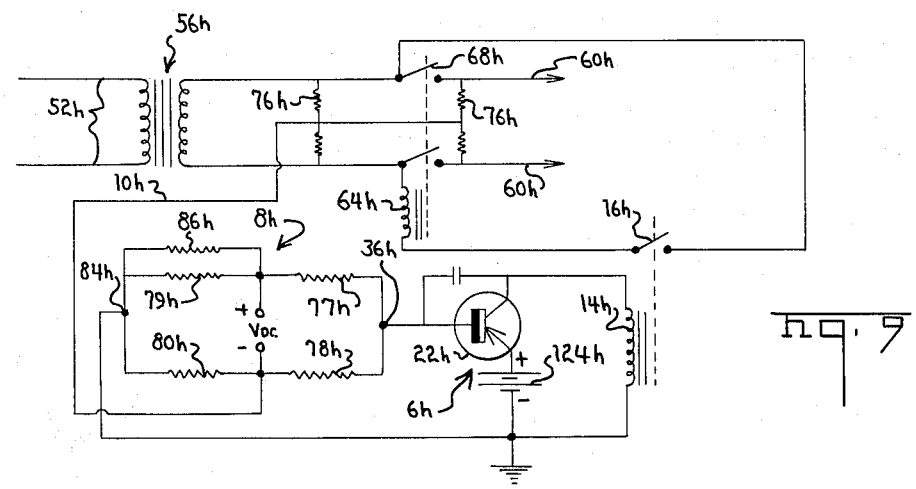
FIGURE 9 is a wiring diagram illustrating transistorization of the circuit of FIGURE 5.

The function of the valve in switch 6 may be performed by devices other than a vacuum tube as will also be apparent to the skilled in the art. In the exemplary embodiment of FIGURE 9 a guard circuit generally similar to the guard circuit of FIGURE 7 is shown. Valve 22h, however, takes the form of a type PNP transistor which is biased by network 8h so as to be normally in the conductive state thereby to energize coil 14h for closing contact 16h and energizing coil 64h of the slave relay. Detected leakage resistance on service lines 60h upsets the bias established by network 8h to reduce the conduction of the transistor below energization of coil 14h for interruption of service, similar to the operation of the circuit of FIGURE 7.

More particularly, a D.C. source, such as a battery 124h is connected at its positive terminal to the transistor emitter and at its negative terminal to the transistor collector through coil 14h. The resistor bridge network 8h is connected between the transistor base and the emitter through the grounded negative terminal of battery 124h, resistor 86h unbalancing the bridge so that its output between junctions 84h and 36h adds serially to battery 124h to the forward or positive bias of the transistor emitter-base circuit. Note in this case that resistor 86h parallel resistor 79h on the remote side of the bridge to render junction 84h more positive than tap point 36h. Reverse or negative bias for the collector-base circuit is provided by the connection of battery 124h between the emitter and collector of the transistor. Condenser 44h, connected between base and collector, again serves to by-pass any A.C. energy on detector line 10h which otherwise might affect the collector-base bias. Detector line 10h, through resistor network 76h and by connection to one side of resistor 80h, places the insulation gap between lines 60h and ground across resistor 80h which is in series with unbalanced resistor 79h on the remote side of the bridge, the junction 84h at the other side of resistor 80h being grounded.

As thus connected, degradation of resistor 80h by coupling leakage resistance thereacross causes junction 84h to drop or reverse in voltage potential relative to tap point 36h, which lowers the forward bias on the emitter-base circuit of the transistor and reduces conduction through coil 14h. Detection of leakage resistance below the predetermined magnitude thus results, through selection of proper circuit parameters, in de-energization of relay coils 14h and 64h.

A type NPN transistor may likewise be utilized, except that the bias voltages will be reversed with the bridge network arranged to shift the controlling voltages in the opposite sense upon leakage resistance being detected.

Other variations within the purview of the present invention will occur to those skilled in the art. For example, network 8, particularly the bridge networks of FIGURES 5 and 7, may be energized by an alternating-current source. In this case the output of the bridge network can be rectified to control valves 22d and 22f; or the valve may be operated as an amplifier to energize the associated relay coil when the bridge network develops its relatively high output in normal operation, but causes de-energization of the relay when the output of the bridge decreases due to detected leakage resistance.

I claim:

1. A control system comprising a current-energized load circuit, voltage-sensitive means including circuit closing means operative to close said load circuit for controlling the energization of said load circuit, and voltage-developing means coupled to said voltage-sensitive means and being operative to develop a voltage within a predetermined range and apply it to said voltage-sensitive means thereby causing the latter means to enable the energization of said load circuit, said voltage-sensitive means being self-operative to interrupt energization of said load circuit when the voltage developed by said developing means varies from said predetermined range, and means coupled to said voltage-developing means for producing a signal in response to a voltage produced by said developing means which comes within a predetermined range different from said predetermined range.

2. The control system according to claim 1 wherein said other predetermined range includes voltages which are lower than those in said predetermined range.

3. A circuit system for controlling current flow to a current energized load circuit comprising an electronic conduction valve means for controlling the energization of the load circuit and having a control electrode, a voltage dividing impedance network having a tap point coupled to said control electrode, means for excitting said network to develop at said tap point a bias voltage above a given level sufficient to cause said valve means to permit energization of the load circuit, a detector lead having one end connected to a junction in said impedance network and the other end connected to a circuit point for detection of impedance for coupling detected impedance to the impedances of said network to alter the voltage division and to shift the bias voltage at said tap point, said network being responsive to detected passive impedance below a given value to reduce the bias voltage below said given level.

4. A circuit system comprising: a current energized load; first circuit means for supplying current to said load including a power supply line, electronic conduction valve means having a control electrode, and biasing means coupled to said valve means for maintaining a current level in said first circuit below the energization level of said load upon energization of said supply line; detector lead means adapted to be connected across a circuit branch of potential decrease in resistance; and second circuit means responsive in inverse relation to the resistance across said detector lead means to apply a conduction bias to said control electrode, said second circuit means including a resistance bridge, one of the two pairs of opposite junctions of said bridge being connected in a series circuit with said control electrode, power supply lead means connected to the other pair of junctions to energize said bridge, said bridge upon energization being unbalanced to have a net positive effect on the control electrode to raise the current level in said first circuit above said energization level, detected resistance at said detector lead means being coupled across a leg of said bridge to shift the net effect of said bridge relative to said control electrode in a negative direction.

5. A guard circuit for a power service line comprising a current energized load circuit for signalling a ground fault on said service line when de-energized, conduction control means coupled to said load circuit and having first and second conductive states to energize and de-energize said load circuit respectively, a control circuit for setting the conductive state of said conduction control means, said control circuit including a voltage-dividing resistance network and a detector line having one end connected to a junction in said network and the other end being adapted for connection to the service line to couple the leakage resistance thereof to said network, said network being responsive to detected leakage resistance above and below a predetermined magnitude to cause said control circuit to set said conduction control means in said first and second states respectively.

6. A guard circuit in accordance with claim 5 wherein said conduction control means comprises a vacuum tube, the leakage resistance path between the filament and the cathode thereof being in the detector line circuit to de-energize said current energized load circuit upon the leakage resistance of said path dropping below said predetermined magnitude.

7. A guard circuit in accordance with claim 5 wherein said conduction control means comprises a vacuum tube having a cathode biasing resistor of a magnitude normally biasing the conduction level of the tube and the control means to said second state.

8. A guard circuit in accordance with claim 5 wherein said conduction control means includes a voltage sensitive device, and said network being normally energized to develop a control voltage applied to said voltage sensitive device, said detector line means coupling detected leakage resistance across a leg of said network to alter the voltage division thereof to shift said control voltage in a direction to set said conductive control means in said second state.

9. In a guard circuit for a power service line, a current energized load circuit for signalling a ground fault on said service line when de-energized, electronic conduction valve means having a control electrode and coupled to said load circuit, said valve means having first and second conductive states to energize and de-energize said load circuit respectively, a control circuit for setting the conductive state of said valve means including biasing means effective upon energization of said valve means to set the valve means in the first conductive state and a voltage divider network, said network including a resistor in series with the leakage resistance of said service line with the junction therebetween being coupled to said control electrode, and means applying a voltage across said network to develop a control bias voltage at said junction such that a decrease in said leakage resistance decreases said bias voltage relative to said biasing means ultimately to switch said valve means to the second conductive state.

10. In a guard circuit for a power service line, a current energized load circuit for signalling a ground fault on said service line when de-energized, electronic valve means coupled to said load circuit and having first and second conductive states to energize and de-energize said load circuit respectively, said valve means having a plate, a control grid and a cathode, a control circuit for setting the conductive state of said valve means including a cathode degeneration impedance and a voltage divider network connected in parallel across said impedance, said network including a grid-drop resistor connecting said grid to said cathode and the leakage resistance of said service line, said impedance and resistor biasing said valve to conduction in said first and second states for leakage resistance valves above and below a predetermined magnitude respectively upon energization of said plate.

11. A guard circuit for a power service line comprising a current energized load circuit for signalling a ground fault on said service line, electronic conduction valve means having a control electrode and coupled to said load circuit and having first and second conductive states to energize and de-energize said load circuit respectively, said valve means being self-biased upon energization to the second state, a control circuit for shifting the conductive state of said valve means, said control circuit including a resistance bridge network coupled at one junction to said control electrode, one leg of said network normally being relatively low in resistance thereby to unbalance the network, means to apply a voltage across a pair of opposite junctions of said bridge network to develop a bias voltage at said one junction normally effective to shift the conductive state of said valve means to said first state, and detector line means adapted for connection to the service line to couple the leakage resistance thereof across a leg of said network to alter said bias voltage in a direction to shift the conductive state of said valve means to said second state.

12. In a power line guard circuit for an electrical unit enclosed in a metal housing, a power supply cord for energizing said unit extending through an opening in said housing, means for interrupting service by the power line, and actuating means for the service interrupting means including first circuit means sensitive to leakage resistance between the power line and ground, and second circuit means sensitive to leakage resistance between said housing and the conductor wires of said cord, said first and second circuit means having a common resistance sensing means and a detector lead for coupling leakage resistance thereto, first and second branch leads of said detector lead being connected in said first and second circuit means respectively.

13. In a power line guard circuit for an electrical unit enclosed in a metal housing, means for interrupting service by the power line, a power supply cord for energizing said unit extending through an opening in said housing, a metallic sleeve surrounding the portion of said cord extending through said opening and insulated from both said housing and the conductor wires of said cord, and circuit means responsive to a ground fault on the power line to actuate the service interrupting means, said circuit means including detector lead means for coupling the leakage resistance of a ground fault in said circuit means, said detector lead means being connected to said sleeve.

14. In combination with a power line guard circuit, an electrical unit having a transformer, circuit means to actuate the guard circuit including a detector line for coupling leakage resistance into the circuit means thereby to actuate the guard circuit, metallic sheet means interposed between the ends of the windings and the adjacent portions of the core of the transformer, said sheet means being connected to said detector line.

15. In a circuit system including a transformer having a metal core, signal means for detecting leakage resistance in the transformer including a signalling device, circuit means coupled to said signalling device including a detector line for coupling leakage resistance in said circuit means thereby to actuate said signalling device, metallic sheet means interposed between the ends of the windings and the adjacent portions of the core of the transformer, said sheet means being connected to said detector line.

References Cited by the Examiner

UNITED STATES PATENTS

| | | | |
|---|---|---|---|
| 656,680 | 8/1900 | Thomson | 317—14.4 |
| 2,231,670 | 2/1941 | Heller et al. | 328—225 |
| 2,333,537 | 11/1943 | Leonard | 317—14.8 |
| 2,336,872 | 12/1943 | Light | 317—18 |
| 2,478,147 | 8/1949 | Wilson | 317—44 |
| 2,479,345 | 8/1949 | Goldsborough | 317—18 |
| 2,487,675 | 11/1949 | Rutherford | 340—233 |
| 2,542,838 | 2/1951 | Reagan | 317—18 X |
| 2,828,450 | 3/1958 | Pinckaers. | |
| 2,864,036 | 12/1958 | Steiner | 317—44 |
| 2,956,233 | 10/1960 | Reap | 328—225 |
| 3,042,865 | 7/1962 | Stetzler | 317—51 X |
| 3,072,827 | 1/1963 | Benish | 317—44 X |

OTHER REFERENCES

"The Grid Glow Tube Relay" (Knowles), The Electric Journal, vol. XXVI, No. 4, pp. 176–178.

SAMUEL BERNSTEIN, *Primary Examiner.*

MAX L. LEVY, *Examiner.*

J. D. TRAMMELL, *Assistant Examiner.*